(12) United States Patent
Rodrigues

(10) Patent No.: US 6,237,433 B1
(45) Date of Patent: May 29, 2001

(54) ELECTROMECHANICAL ACTUATOR OF THE TYPE HAVING A SCREW-AND-NUT SYSTEM

(75) Inventor: Fernand Rodrigues, Impasse des Troënes (FR)

(73) Assignee: TRW Systemes Aeronauliques Civils (FR)

( * ) Notice: Subject to any disclaimer, the term of this patent is extended or adjusted under 35 U.S.C. 154(b) by 0 days.

(21) Appl. No.: 09/310,630

(22) Filed: May 12, 1999

(30) Foreign Application Priority Data

May 12, 1998 (FR) .................................................. 98 05942

(51) Int. Cl.[7] .............................. F16H 25/20; B64C 9/00
(52) U.S. Cl. ................................... 74/89.15; 74/424.8 R; 188/67; 244/75 R; 403/104
(58) Field of Search ........................... 74/89.15, 424.8 R; 244/75 R; 188/67; 403/104

(56) References Cited

U.S. PATENT DOCUMENTS

| | | | |
|---|---|---|---|
| 4,179,944 | * 12/1979 | Conner | 74/89.15 |
| 4,375,770 | * 3/1983 | Druet | 74/424.8 A |
| 4,530,271 | * 7/1985 | Cronin | 91/509 |
| 4,574,654 | * 3/1986 | Griffiths | 74/625 |
| 4,858,491 | * 8/1989 | Shube | 74/665 B |
| 4,876,906 | * 10/1989 | Jones | 74/89.15 |
| 5,360,185 | * 11/1994 | Derrien | 244/102 R |

FOREIGN PATENT DOCUMENTS

| | | |
|---|---|---|
| 0025750 | 3/1981 | (EP) . |
| 0325027 | 7/1989 | (EP) . |
| 0555122 | 1/1993 | (EP) . |
| 0569775 | 11/1993 | (EP) . |

\* cited by examiner

Primary Examiner—Allan D. Herrmann
(74) Attorney, Agent, or Firm—Blakely Sokoloff Taylor & Zafman

(57) ABSTRACT

An electromechanical actuator comprising a screw that is driven in rotation, a nut that is driven in translation by rotation of the screw, and a guide rod which is driven in translation by the nut, the actuator having a plurality of rollers interposed between the guide rod and the nut, said rollers having a succession of annular grooves and ridges, while the outside surface of the nut and the inside surface of the guide rod have respective pluralities of complementary grooves and ridges, the grooves and ridges of the rollers co-operating with the grooves and ridges of the nut and of the guide rod to transmit axial force on the guide rod to the nut when said rollers are in an engaged position, the nut and/or the guide rod having release channels in angular positions that are designed to coincide with the positions of the rollers when they are declutched, said channels being such that they enable at least some of the grooves and ridges to be disengaged so as to release the guide rod to move in translation relative to the nut, the actuator including means enabling said rollers to be moved from their clutched position to their declutched position.

12 Claims, 4 Drawing Sheets

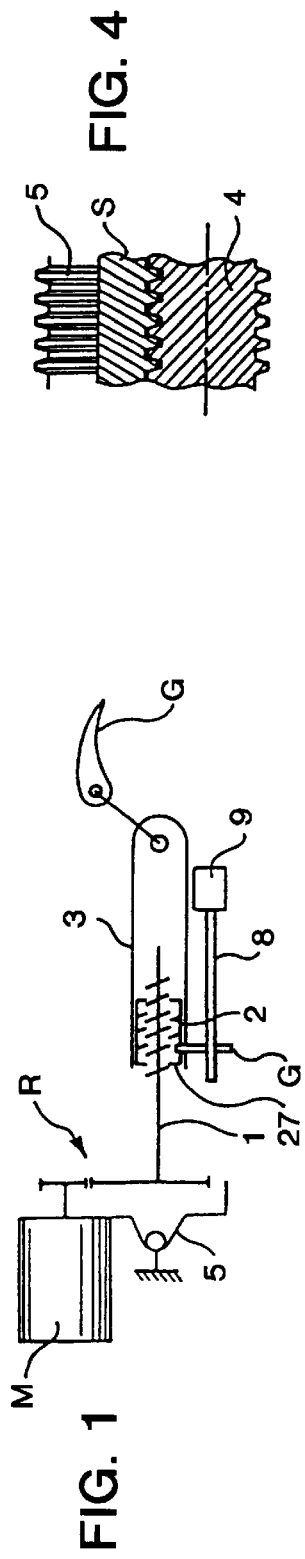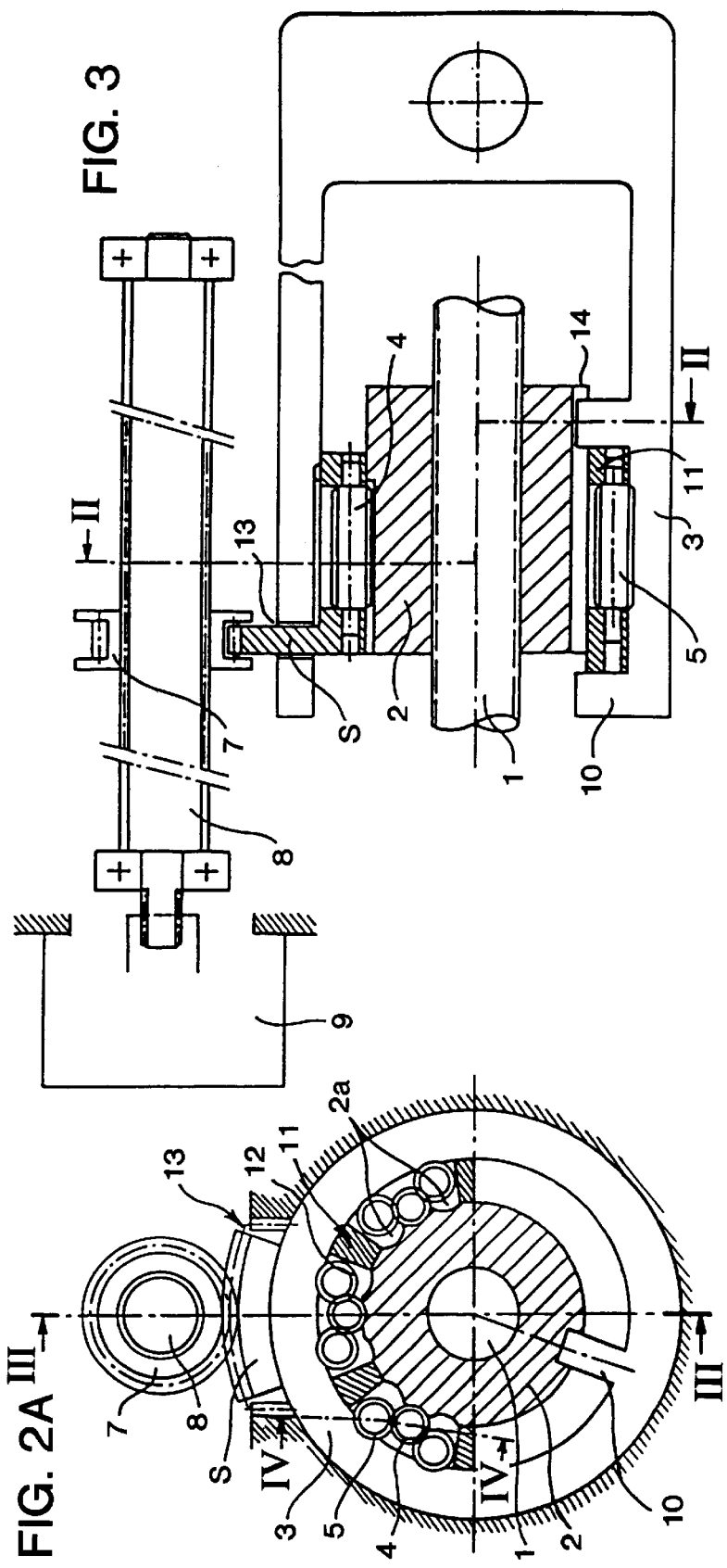

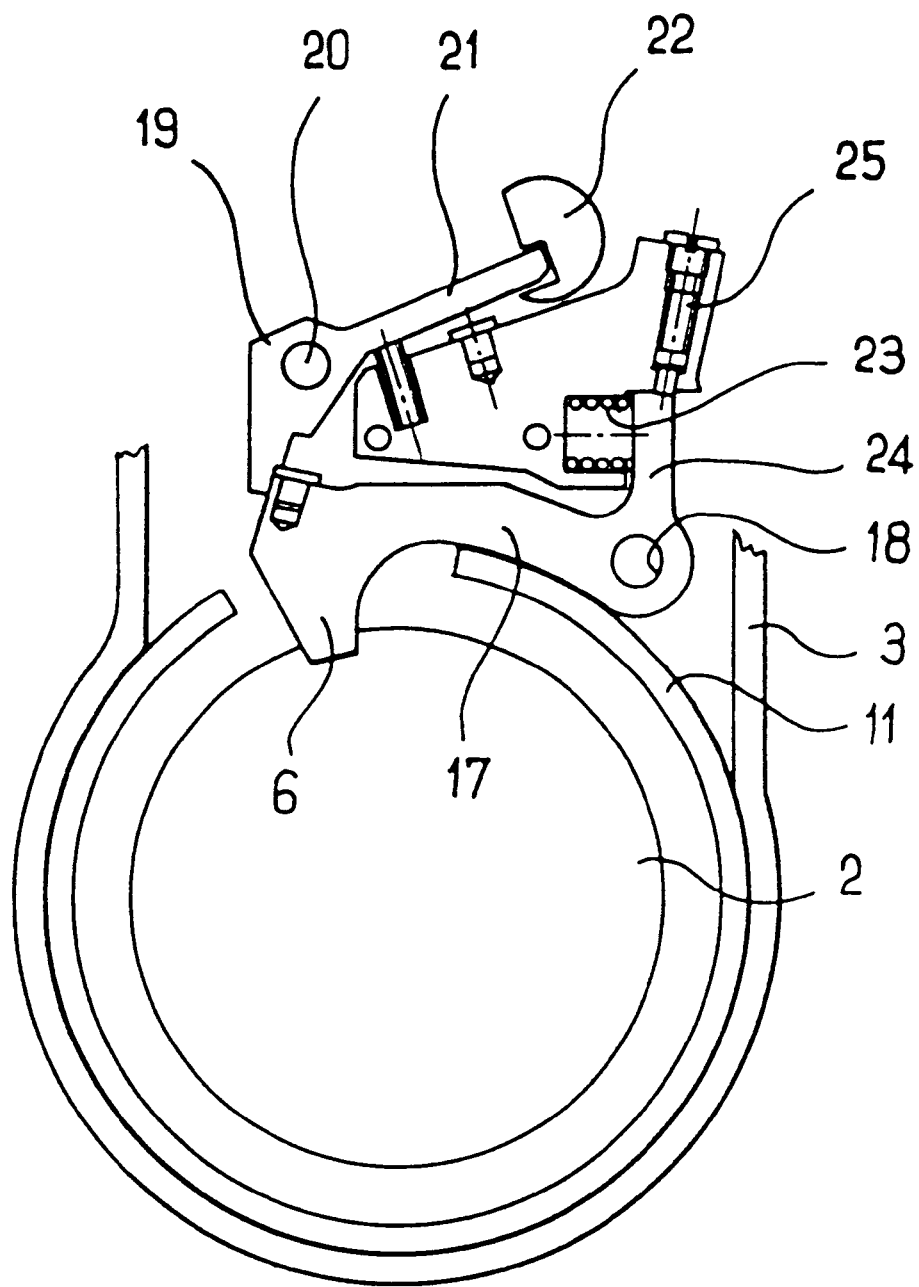
FIG_8

ELECTROMECHANICAL ACTUATOR OF THE TYPE HAVING A SCREW-AND-NUT SYSTEM

The present invention relates to electromechanical actuators of the type having a screw-and-nut system.

BACKGROUND OF THE INVENTION

There is a desire, particularly in the field of aviation, to be able to replace hydraulic controls by electromechanical controls.

In particular, proposals have already been made to use electromechanical actuators of the type having a screw-and-nut system for the purpose of controlling the movements of aircraft control surfaces or indeed for extending and retracting landing gear.

Naturally, such actuators must be particularly reliable.

That is why electromechanical actuators are generally mounted in pairs, with one of the actuators in a pair being a passive actuator capable of taking over from the other actuator in the event of it failing.

Nevertheless, the passive actuator is subjected to the same mechanical stresses as the active actuator and it can happen, particularly for primary flight controls whose surfaces are continually loaded, that both actuators fail simultaneously.

The probability of such an accident is low. Nevertheless, to limit the consequences that could arise therefrom, it is desirable to be able to declutch from control any members that might become jammed by actuator failure. In particular, for all types of accident that can happen on an actuator, it is desirable to be able to release flight control surfaces and to prevent them becoming jammed in an end-of-stroke position.

Electromechanical actuator structures of the type having a screw-and-nut system are already known in which it is possible to decouple the screw from the motor and gear box unit which drives it so that if the unit jams, then the screw can still rotate and the controlled member is not locked in position.

In this respect, reference can be made to European patent application EP 0 555 122.

Nevertheless, the structure described in that patent application does not enable the controlled member to be released in the event of the accident being due to the nut jamming relative to the screw.

OBJECTS AND SUMMARY OF THE INVENTION

The invention proposes an actuator structure which enables the nut to be declutched from the structure which drives it in axial translation.

To this end, the invention provides an electromechanical actuator comprising a screw that is driven in rotation, a nut that is driven in translation by rotation of the screw, and a guide rod which is driven in translation by the nut, the actuator having a plurality of rollers interposed between the guide rod and the nut, said rollers having a succession of annular grooves and ridges, while the outside surface of the nut and the inside surface of the guide rod have respective pluralities of complementary grooves and ridges, the grooves and ridges of the rollers co-operating with the grooves and ridges of the nut and of the guide rod to transmit axial force on the guide rod to the nut when said rollers are in an engaged position, the nut and/or the guide rod having release channels in angular positions that are designed to coincide with the positions of the rollers when they are declutched, said channels being such that they enable at least some of the grooves and ridges to be disengaged so as to release the guide rod to move in translation relative to the nut, the actuator including means enabling said rollers to be moved from their clutched position to their declutched position.

Advantageously, the actuator can also have the various characteristics below taken singly or in any technically feasible combination:

the actuator has an intermediate piece defining a plurality of cages in which the rollers are received;

it has three rollers per cage, with the rollers in the clutched position comprising two rollers pressing against the inside surface of the guide rod while the third roller presses against the outside surface of the nut, the grooves and ridges of the third roller co-operating with the grooves and ridges of the other two rollers;

the intermediate piece has a sector which extends outside the guide rod and which co-operates with gearwheel-forming means enabling said intermediate piece to be tilted and enabling the rollers to be moved from the declutched position to the clutched position;

it includes one or more pegs extending radially through the guide rod and having one end received in a respective housing in the nut, said peg(s) preventing the guide rod form rotating relative to the nut;

the intermediate part has spring-forming means applying a radial force on the rollers to urge them into the declutching channels presented in the guide rod or in the nut;

the channels are formed in the inside surface of the guide rod;

it includes a pin extending through the guide rod and having an end received in the housing presented in the nut, said pin preventing the guide rod from rotating relative to the nut, and means enabling said pin to be moved so as to disengage it from the nut;

said means enabling said pin to be moved comprise a follower gearwheel suitable for sliding along a control rod designed to drive it in rotation; and in a variant the pin terminates in a lever-forming arm on which a prestressed spring exerts a tilting torque, motor-driven means enabling said arm to be released for tilting.

The actuator of the invention is advantageously used in systems that require onboard actuators on vehicles, and particularly but not exclusively on board aircraft.

BRIEF DESCRIPTION OF THE DRAWINGS

Other characteristics and advantages of the invention appear further from the following description. The description is purely illustrative and non-limiting. It should be read with reference to the accompanying drawings, in which:

FIG. 1 is an overall diagram of a structure for the actuator of an aircraft control surface;

FIG. 2A is an axial section view through an actuator of the type shown diagrammatically in FIG. 1 (section II—II in FIG. 3);

FIG. 3 is a section view on line III—III of FIG. 2;

FIG. 4 is a section view on line IV—IV of FIG. 2;

FIG. 8 is a diagram showing another possible embodiment for controlling the pin in the variant of FIGS. 5 to 7.

MORE DETAILED DESCRIPTION

The actuator which is shown in FIG. 1 is an actuator for controlling a control surface G of an aircraft.

The actuator has a screw 1 mounted to rotate relative to the structure S of an airplane, and rotated about its axis by one or more electric motors M and stepdown gearing R.

The screw 1 co-operates with a nut 2 which is itself secured to a guide rod 3 which is free to move in translation relative to the structure of the airplane and which is connected to a control surface G by a link which is such that moving the nut 2 and the guide rod 3 in translation by rotating the screw 1 causes the control surface G to move.

The screw-and-nut system can be a system using balls, rollers, or complementary profiles: e.g. trapezoidal, square, or ISO profiles.

Figure 2B:
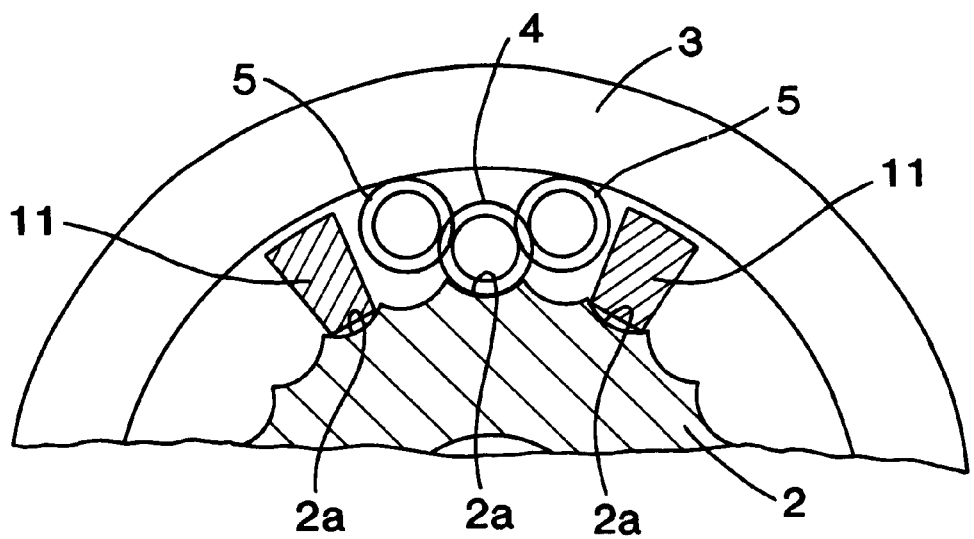
FIG. 2B is a section view through an actuator of the type shown in FIG. 1, illustrating rollers in their declutched position.

Whereas the guide rod in a prior art actuator structure is generally integral with the nut, or is fixed thereto, in the structure shown in FIGS. 2 to 4, the guide rod 3 and the nut 2 are two distinct parts that are disposed coaxially and that are connected to each other by declutchable means so that, when necessary, it is possible to allow the guide rod 3 to move in translation relative to the nut 2.

More particularly, an annular part 11 which defines a plurality of rotation cages 12 for rollers 4 and 5 is interposed with a small amount of radial clearance between the guide rod 3 and the nut 2.

The cages 12 are uniformly distributed around the periphery of said part 11. Each receives two rollers 5 and one roller 4; these rollers 4, 5 are intermediate rollers which are mounted to rotate in said cages 12 and which extend parallel to the axis that is common to the nut 2, the guide rod 3, and the screw 1.

The two rollers 5 bear against the inside surface of the guide rod 3 and against the roller 4; the roller 4 bears against the two rollers 5, and against the outside face of the nut 2.

As shown in FIG. 4, each of the rollers 4 and 5 has a plurality of annular grooves which define ridges between them occupying median planes extending perpendicularly to the axes of said rollers. The grooves and the ridges of the rollers 4 and 5 are of complementary shapes; when the rollers 4 and 5 are in their clutched position, as shown in FIGS. 2 to 4, the ridges of the roller 4 are received snugly in the grooves of the rollers 5, while the ridges of the rollers 5 are received snugly in the grooves of the roller 4.

Similarly, the inside surface of the guide rod 3 and the outside surface of the nut 2 both have respective successions of annular grooves and ridges complementary to those of the rollers 4 and 5; in the clutched position of the rollers 4 and 5, the ridges of the roller 4 are received snugly in the grooves of the nut 2 while the ridges of the rollers 5 are received snugly in the grooves of the guide rod 3.

The interfitting between the grooves and the ridges of the rollers 4 and 5, of the guide rod 3, and of the nut 2 ensure that the nut 2 is constrained to move with the guide rod 3 in axial displacement.

During displacement of the nut 2, stresses are distributed over all of the lines of contact between the nut 2 and the various rollers 4 distributed around said nut, and over all of the lines of contact between the rollers 5 and the rollers 4, and the lines of contact between the rollers 5 and the guide rod 3.

Because of this multitude of lines of contact, axial force is distributed over the entire periphery of the nut 2.

It will be observed that the profile of the grooves and the ridges of the rollers 4 and 5 (their slopes relative to the axes of the rollers) is optimized firstly to minimize radial force between the rollers due to the axial force being transmitted, and secondly to distribute the axial force around and along the length of the nut.

The nut 2 has a plurality of fluting channels 2a which extend along the generator lines of said nut 2 and which are uniformly distributed around the periphery thereof. There are twice as many such channels as there are cages 12.

In the clutched position, the portions of the periphery of the nut 2 which lie between two channels 2a face a wall of the part 11 extending between two successive cages 12 or else face a roller 4 that is bearing against said periphery.

These channels 2a are designed to receive the rollers 4 in the declutched position. They are deeper than the grooves in the nut 2 and in the rollers 4 and 5, such that the grooves and the ridges of said rollers 4 are disengaged from the grooves and the ridges of the nut 2 when said rollers 4 are in their declutched position, and such that said rollers 4, the rollers 5, and the guide rod 3 can then move freely in translation relative to the nut 2.

At one end, the rod 3 has an opening 13 into which there projects a sector S extending radially from the annular part 11.

The opening 13 has abutments that serve to limit angular displacement of the sector S.

The sector S co-operates with a tracking gearwheel 7 which is mounted to slide freely on a drive shaft 8. The link between the gearwheel and the rod can be of the type comprising fluting or a ball bushing to minimize friction.

When said shaft 8 is rotated by drive means 9, the toothed sector S and the part 11 are tilted, and consequently the cages 12 are caused to pass from a position in which the rollers 4 and 5 are clutched to a position in which the rollers 4 are in register with the channels 2a and the rollers 4 and 5 are declutched.

When the guide rod 3 is declutched from the nut 2, the rollers 4 and 5 roll without sliding over the nut 2 inside the guide rod 3, and friction is minimized.

In addition, one or more pegs 10 are provided which extend through the guide rod 3 and also through an axial channel 14 formed on the outside surface of the nut 2.

These pegs 10 prevent the guide rod 3 from rotating relative to said nut 2.

In normal operation of the actuator to actuate the control surface, the gearwheel 7 slides freely on the rod 8. To disconnect the rod 3 from the nut 2, the electric motor 9 is used to rotate the parts 8, 7, 6, 5, and 4. An abutment on the rod limits the extent to which the sector S can move.

After this rotation, the positions of the rollers 4 coincide with the positions of the channels 2a of the nut. In this position, the rollers 4 no longer bear axially against the channels of the nut. The guide rod 3 can therefore move axially without driving the nut 2.

Figure 6:
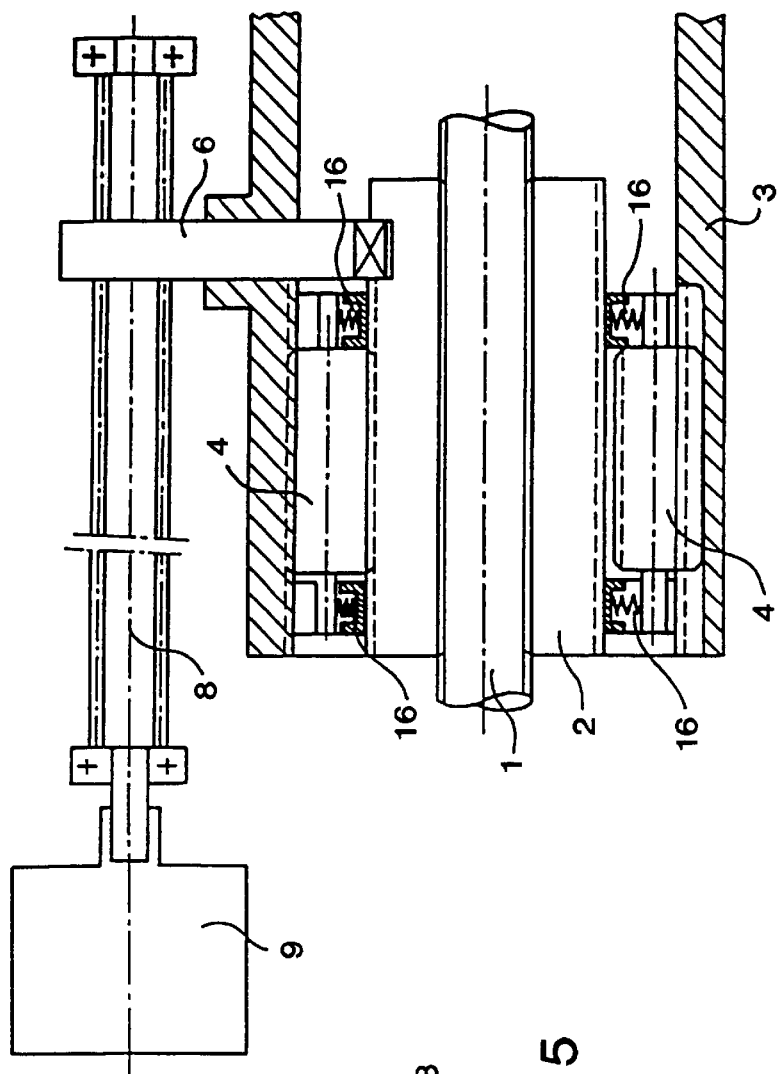
FIG. 6 is a fragmentary section view on line VI—VI of FIG. 5.
Figure 5:
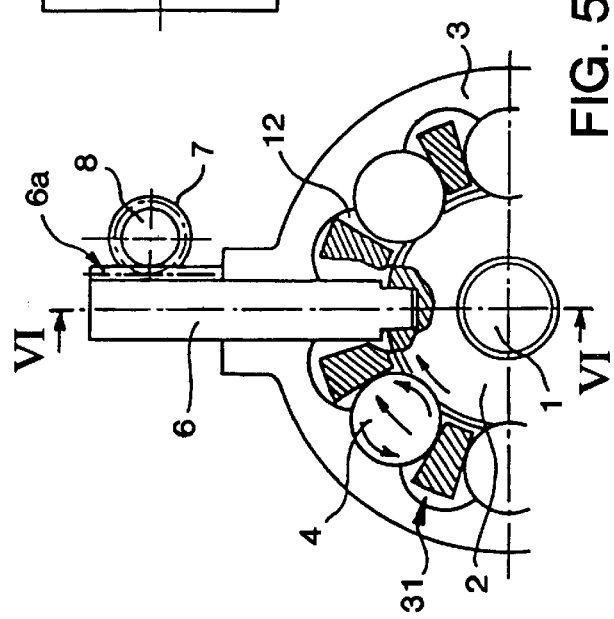
FIG. 5 is a diagram similar to FIG. 2 showing another possible variant of the invention.
Figure 7:
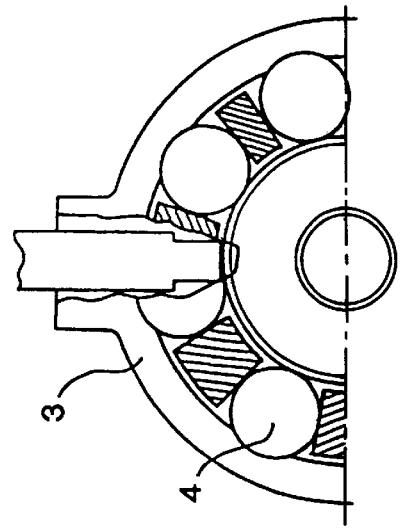
FIG. 7 is a view similar to that of FIG. 5 showing the variant of FIGS. 5 and 6 in its released position.

In the embodiment which is shown in FIGS. 5 to 7, each of the cages 12 as defined by the intermediate piece receives only a single roller 4 which is disposed between the nut 2 and the guide rod 3.

The outside surface of the nut 2 and the inside surface of the guide rod 3 have respective pluralities of annular grooves and ridges extending perpendicularly to their axis, co-operating with complementary grooves and ridges on the rollers 4 so that in the engaged position the axial force on the guide rod 3 is transmitted to the nut 2.

At one of its axial ends, the nut 2 has a housing in which there is received the end of an antirotation pin or key 6 which extends through the guide rod 3.

This pin 6 is terminated by a rack 6a which co-operates with a tracking gearwheel 7 mounted to slide on a control rod 8 driven by drive means 9.

The cages 12 hold the rollers in place. Axial and radial clearance remains between said cages and the rollers. The rollers can move radially relative to the cage.

Between the nut and the rod, the rollers 4 are mounted snugly in the axial direction.

Springs 16 are mounted in said cages 12 and exert outwardly directed radial force on said rollers 4 so as to urge the rollers against the guide rod 3.

The guide rod has a plurality of channels 31 which extend along its generator lines and which are designed to receive the rollers 4 in the declutched position thereof.

These channels 31 are deeper than the grooves and ridges of the rollers 4 and of the nut 2 so that the grooves and ridges of the rollers 4 are disengaged from those of the nut 2 when the rollers 4 are located fully home in said channels 31.

In normal operation, the rod 3 slides axially in a case which is fixed relative to the structure of the aircraft, and a lug 27 prevents said guide rod 3 rotating relative to said case.

Axial force is transmitted to the nut 2 via the rollers 4. The antirotation pin 6 ensures that the nut 2 is constrained to rotate with the rod 3. During axial displacement of the nut 2, the pin 6 slides without friction along the rod 8.

Declutching is performed as follows.

The electric motor 9 rotates the control rod 8. This moves the pin 6 in translation via the rack 6a and gearwheel 7 (or any other suitable device) until the pin 6 has been completely disengaged from its housing in the nut 2. The screw-and-nut assembly is then free to rotate. Rotation of the motor for controlling the flight control surface causes the nut 2 and the screw 1 that has jammed relative to said nut to rotate relative to the guide rod 3.

When the positions of the rollers 4 coincide with the axial channels of the guide rod 3, the return springs 16 urge the rollers 4 into the channels 31 of the guide rod. The channels are of a depth that is such that when the rollers are fully home in said channels, the rollers are completely disengaged from the grooves in the nut. In this configuration, the guide rod can move freely relative to the nut.

FIG. 8 shows another way of controlling the pin 6 of the variant shown in FIGS. 5 to 7.

In this embodiment, the pin 6 is terminated by an arm 17 forming a lever that is hinged to pivot about an axis 18 parallel to the axis of the screw 1. This axis is situated in a plane which is tangential to said nut 2 at the point where the pin 6 engages in the nut 2.

The arm 17 which terminates with the pin 6 is normally held in its position where the pin 6 is engaged relative to the nut 2 by an abutment-forming member 19. This abutment-forming member 19 then presses against the arm 17 so as to prevent any tilting movement thereof which could release the nut 2.

The abutment-forming member 19 is also mounted to pivot about an axis referenced 20 and parallel to the axis 1, located at its end remote from its portion designed to press against the arm 17, the member 19 having a portion 21 that forms a lever whose end co-operates with a cam-forming element 22.

When, as is normally the case, the pin 6 is engaged in the nut 2, no torque is transmitted to the control shaft 21 by the locking which is achieved by the pin 6 in the nut 2.

The cam-forming element 22 is mechanically connected to a motor which, for the purpose of releasing the guide rod 3, rotates the cam 22 in such a manner that the element 19 is raised relative to the arm 17.

A prestressed compression spring 23 bearing against an angled portion 24 extending from the arm 17 then causes said arm 17 to tilt, thereby disengaging the pin 6 from the nut 2.

A key 25 then engages in a hole (not shown) which terminates said angled portion 24. As a result the arm 17 is locked in its position where the pin 6 is disengaged from the nut 2.

It will be observed that with a structure of the type described above, the energy required for disengaging the pin 6 from the nut 2 is very small.

It will also be observed that with the devices described above, in order to prevent the flight control surface and the actuator being disconnected, it is necessary for two events to occur simultaneously, namely: depending on the embodiment concerned, either the screw jams relative to the nut and the main motor for activating the control surface breaks down; or else the screw and nut jam together and the disconnection motor breaks down.

What is claimed is:

1. An electromechanical actuator comprising a screw that is driven in rotation, a nut that is driven in translation by rotation of the screw, and a guide rod which is driven in translation by the nut, the actuator having a plurality of rollers interposed between the guide rod and the nut, said rollers having a succession of annular grooves and ridges, while the outside surface of the nut and the inside surface of the guide rod have respective pluralities of complementary grooves and ridges, the grooves and ridges of the rollers co-operating with the grooves and ridges of the nut and of the guide rod to transmit axial force on the guide rod to the nut when said rollers are in an engaged position, the nut and/or the guide rod having release channels in angular positions that are designed to coincide with the positions of the rollers when they are declutched, said channels being such that they enable at least some of the grooves and ridges to be disengaged so as to release the guide rod to move in translation relative to the nut, the actuator including means enabling said rollers to be moved from their clutched position to their declutched position.

2. An actuator according to claim 1, having an intermediate piece defining a plurality of cages in which the rollers are received.

3. An actuator according to claim 2, having three rollers per cage, with the rollers in the clutched position comprising two rollers pressing against the inside surface of the guide rod while the third roller presses against the outside surface of the nut, the grooves and ridges of the third roller co-operating with the grooves and ridges of the other two rollers.

4. An actuator according to claim 2, wherein the intermediate piece has a sector which extends outside the guide rod and which co-operates with gearwheel-forming means enabling said intermediate piece to be tilted and enabling the rollers to be moved from the declutched position to the clutched position.

5. An actuator according to claim 4, including one or more pegs extending radially through the guide rod and having one end received in a respective housing in the nut, said peg(s) preventing the guide rod form rotating relative to the nut.

6. An actuator according to claim 1, wherein the intermediate part has spring-forming means applying a radial force on the rollers to urge them into the declutching channels presented in the guide rod or in the nut.

7. An actuator according to claim 6, wherein the channels are formed in the inside surface of the guide rod.

8. An actuator according to claim 6, including a pin extending through the guide rod and having an end received in the housing presented in the nut, said pin preventing the guide rod from rotating relative to the nut, and means enabling said pin to be moved so as to disengage it from the nut.

9. An actuator according to claim 8, wherein said means enabling said pin to be moved comprise a follower gearwheel suitable for sliding along a control rod designed to drive it in rotation.

10. An actuator according to claim 8, wherein the pin terminates in a lever-forming arm on which a prestressed spring exerts a tilting torque, motor-driven means enabling said arm to be released for tilting.

11. An electromechanical actuator on board a vehicle, comprising:

a screw that is driven in rotation, a nut that is driven in translation by rotation of the screw, a guide rod which is driven in translation by the nut, and a plurality of rollers interposed between the guide rod and the nut, said rollers having a succession of annular grooves and ridges, while the outside surface of the nut and the inside surface of the guide rod have respective pluralities of complementary grooves and ridges, the grooves and ridges of the rollers cooperating with the grooves and ridges of the nut and of the guide rod to transmit axial force on the guide rod to the nut when said rollers are in an engaged position, the nut and/or the guide rod having release channels in angular positions that are designed to coincide with the positions of the rollers when they are declutched, said channels being such that they enable at least some of the grooves and ridges to be disengaged so as to release the guide rod to move in translation relative to the nut, the actuator including means enabling said rollers to be moved from their clutched position to their declutched position.

12. The electromechanical actuator of claim 11, wherein said vehicle is an aircraft.

* * * * *

UNITED STATES PATENT AND TRADEMARK OFFICE
CERTIFICATE OF CORRECTION

PATENT NO.    : 6,237,433 B1
DATED         : May 29, 2001
INVENTOR(S)   : Rodrigues It is certified that error appears in the above-identified patent and that said Letters Patent is hereby corrected as shown below:

<u>Title page,</u>
Item [73] Assignee, delete "Aeronaulique" and insert -- Aeronautique --.

Signed and Sealed this

Twenty-first Day of May, 2002

Attest:

Attesting Officer

JAMES E. ROGAN
*Director of the United States Patent and Trademark Office*